US012656166B2

(12) United States Patent    (10) Patent No.:    US 12,656,166 B2
Riles et al.    (45) Date of Patent:    Jun. 16, 2026

(54) OIL LEVEL SENSING AND FAULT DETECTION

(71) Applicant: Textron Aviation Inc., Wichita, KS (US)

(72) Inventors: Devin Andrew Riles, Wichita, KS (US); Gregory F. Light, Wichita, KS (US); Philip M. Knapp, Wichita, KS (US); Joseph Hambleton, Wichita, KS (US); Scott A. Seaton, Towanda, KS (US)

(73) Assignee: Textron Innovations Inc., Providence, RI (US)

( * ) Notice: Subject to any disclaimer, the term of this patent is extended or adjusted under 35 U.S.C. 154(b) by 337 days.

(21) Appl. No.: 18/315,361

(22) Filed: May 10, 2023

(65) Prior Publication Data

US 2023/0375393 A1    Nov. 23, 2023

Related U.S. Application Data

(60) Provisional application No. 63/344,935, filed on May 23, 2022.

(51) Int. Cl.
| | |
|---|---|
| *G01F 23/72* | (2006.01) |
| *F01M 11/12* | (2006.01) |
| *H01H 36/02* | (2006.01) |

(52) U.S. Cl.
CPC ............. *G01F 23/72* (2013.01); *F01M 11/12* (2013.01); *H01H 36/02* (2013.01)

(58) Field of Classification Search
None
See application file for complete search history.

(56) References Cited

U.S. PATENT DOCUMENTS

| | | | | |
|---|---|---|---|---|
| 3,614,887 | A | 10/1971 | Douglass | |
| 5,627,380 | A * | 5/1997 | Crowne | G01F 23/04 |
| | | | | 250/577 |
| 8,049,607 | B2 | 11/2011 | Usukura et al. | |
| 10,436,627 | B2 | 10/2019 | Roux | |
| 11,125,603 | B2 | 9/2021 | Bregani et al. | |
| 2013/0218399 | A1* | 8/2013 | Demaison | F01D 25/18 |
| | | | | 701/33.9 |
| 2019/0033118 | A1* | 1/2019 | Taillon | G01F 23/30 |
| 2020/0056926 | A1* | 2/2020 | McCarthy | H01H 36/02 |
| 2020/0340375 | A1* | 10/2020 | Dupays | F01M 1/16 |
| 2021/0190569 | A1* | 6/2021 | Khan | H01H 36/02 |
| 2022/0341764 | A1* | 10/2022 | Cunha | G01R 33/0029 |

* cited by examiner

*Primary Examiner* — Mark A Shabman
(74) *Attorney, Agent, or Firm* — Avek IP, LLC

(57) ABSTRACT

An oil level measurement system for an aircraft engine includes a magnetic float disposed in the aircraft engine, a first sensor ladder configured for sensing a position of the magnetic float, and a second sensor ladder configured for sensing a position of the magnetic float. A controller is configured to determine an oil level of an engine based on an engine status signal, a first signal from the first sensor ladder, and a second signal from the second sensor ladder. An oil level sensing method for measuring an oil level within an aircraft engine when the aircraft engine is off includes comparing a first signal from a first sensor ladder with a second signal from a second sensor ladder, indicating a fault when the first signal is different from the second signal, and determining an oil level of an aircraft engine when the first signal matches the second signal.

14 Claims, 6 Drawing Sheets

OIL LEVEL SENSING AND FAULT DETECTION

CROSS-REFERENCE TO RELATED APPLICATIONS

This application claims the benefit of priority of U.S. Provisional Patent Application No. 63/344,935, entitled Oil Level Sensing and Fault Detection and filed on May 23, 2022, the disclosure of which is herein incorporated by reference in its entirety.

BACKGROUND

1. Field

Embodiments of the invention relate generally to oil level sensing, and more specifically to oil level sensor fault detection.

2. Related Art

Various solutions have been proposed for measuring oil quantity within an aircraft engine. For example, oil level may be manually checked during a pre-flight, which may involve an operator manually inspecting the oil level using a dipstick or other manual technique. Further, some solutions automatically measure an oil level quantity using a sensor. However, these solutions fail to address various issues associated with providing the reliability necessary to meet the safety criteria for a pre-flight aircraft engine check. Specifically, in some cases, incorrect and misleading data collected from faulty sensors may be communicated to operators.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an oil level measurement system for measuring an oil level within an aircraft engine includes: a magnetic float disposed in the aircraft engine; a first sensor ladder configured for sensing a position of the magnetic float; a second sensor ladder configured for sensing a position of the magnetic float; an aircraft engine status signal indicative of a current state of the aircraft engine; a controller configured to receive the aircraft engine status signal, a first signal from the first sensor ladder, and a second signal from the second sensor ladder, wherein the controller is configured to determine an oil level of the aircraft engine based on the aircraft engine status signal, the first signal, and the second signal.

In another embodiment, an oil level sensing and fault detection method for measuring an oil level within an aircraft engine when the aircraft engine is off includes: receiving via a controller a first signal from a first sensor ladder, wherein the first signal is indicative of a position of a magnetic float disposed in the aircraft engine; receiving via the controller a second signal from a second sensor ladder, wherein the second signal is indicative of the position of the magnetic float within the aircraft engine; comparing via the controller the first signal with the second signal to determine whether the first signal is different from the second signal; when the first signal is different from the second signal, transmitting via the controller a notification signal indicative of a fault to a notification subsystem; and when the first signal matches the second signal, determining via the controller an oil level of the aircraft engine based on the first signal and the second signal.

BRIEF DESCRIPTION OF THE DRAWING FIGURES

Embodiments of the invention are described in detail below with reference to the attached drawing figures, wherein.

Figure 1:
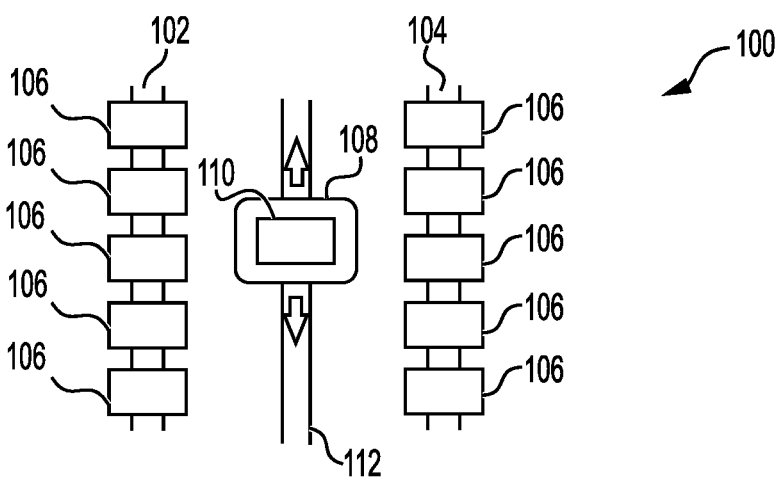
FIG. 1 depicts an exemplary diagram of an oil level sensor assembly relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary diagram of an oil level sensor assembly 100 is depicted relating to some embodiments of an oil level measurement system. In some such embodiments, the oil level sensor assembly 100 may be disposed within an engine such as an aircraft engine of an aircraft. Further, in some embodiments, the oil level sensor assembly 100 may be disposed within an oil sump of the aircraft engine. Further still, in some embodiments, the oil level sensor assembly 100 may be disposed within a twin-engine aircraft. Here, a separate instance of the oil level sensor assembly 100 may be disposed within each engine of the twin-engine aircraft. In some embodiments, the oil level sensor assembly 100 comprises a first sensor ladder 102 and a second sensor ladder 104. Here, each of the first sensor ladder 102 and the second sensor ladder 104 may comprise a plurality of reed switches 106. For example, embodiments are contemplated in which the first sensor ladder 102 comprises a first plurality of reed switches and the second sensor ladder 104 comprises a second plurality of reed switches. In some embodiments, the reed switches 106 may be secured to a wall of the aircraft engine. For example, in some embodiments, the reed switches 106 are secured to an inner surface of the aircraft engine. Alternatively, or additionally, the reed switches 106 may be secured to an outer surface of the aircraft engine.

In some embodiments, the oil level sensor assembly 100 further comprises a float 108 disposed within the aircraft engine. The float 108 is configured to change position along with the oil level of the aircraft engine. For example, the float 108 may float along the top of the oil within the aircraft engine such that when the engine oil level rises or falls the float 108 rises or falls accordingly. In some embodiments, the float 108 may be disposed between the first sensor ladder 102 and the second sensor ladder 104, as shown. Embodiments are contemplated in which the float 108 is a magnetic float that comprises a magnet 110, which may be disposed on or within the float 108, as shown. Accordingly, the reed switches 106 may be configured to measure the position of the float 108 based on interaction with the magnet 110. For example, in some embodiments, the reed switches 106 are affected by a magnetic field associated with the magnet 110. In some embodiments, the reed switches 106 are configured to open or close based on the proximity of each respective reed switch 106 to the magnet 110. The first sensor ladder 102 and second sensor ladder 104 are oriented vertically with respect to the oil containing portion of the aircraft engine, and the individual reed switches 106 each correspond with a known oil level within the aircraft engine. Therefore, based upon a vertical position (e.g., height) of the reed switches 106, the vertical position of the magnet 110 and the float 108 can be inferred based on signals received from the reed switches 106. Accordingly, the vertical position of the float 108 may be used as an indication of the oil level within the aircraft engine because the vertical position of the float 108 changes based on the oil level.

In some embodiments, a float guide 112 may be included for guiding the float 108 through the aircraft engine. For example, float guide 112 comprises a vertical orientation configured to guide movement of the float along a vertical direction. For example, in some embodiments, the float guide 112 comprises a rod, as shown, inserted into a hollow portion of the float 108. Alternatively, in some embodiments, the float guide 112 may comprise a cutaway portion defining a track for the float 108 to slide along. In some embodiments, the float guide 112 provides for smooth and controlled vertical translation of the float 108 within the aircraft engine. For example, in some embodiments, the float guide 112 prevents horizontal movement of the float 108 such that the float 108 is constrained to move only along a vertical axis. In some embodiments, preventing horizontal movement of the float 108 reduces the probability of the float 108 becoming stuck in the aircraft engine.

In some embodiments, each of the first sensor ladder 102 and the second sensor ladder 104 are designed to be redundant. For example, first and second sensor ladders 102, 104 are designed with the same or similar architecture and construction (e.g., same number and position of reed switches 106, same number and position of resistors 202 of FIG. 2, same materials and process of forming, etc.) to provide redundancy between sensor ladder readings for increased reliability. For example, the first sensor ladder 102 and the second sensor ladder 104 may be configured to provide similar or substantially the same electrical signals based on a given change in position of the float 108. Accordingly, the electrical signals from each sensor ladder may be compared to determine whether the sensor ladders agree. When the first signal from the first sensor ladder 102 matches the second signal from the second ladder 104, the oil level may be determined as described below. Alternatively, if the signals from the sensor ladders 102 and 104 are substantially different as described below, it may be determined that at least one of the sensor ladders (or it's associated electrical connections) is incorrect, damaged, or otherwise defective. In some embodiments, a fault signal may be generated (e.g., via the controller 306 of FIG. 3) if one or more of the sensor ladders of the sensor assembly 100 is determined to have incorrect readings, as will be described in further detail below. In some embodiments, a calibration of the first and second sensor ladders 102, 104 may be performed prior to their use in the field to compensate for any differences in the electrical signals from the first and second sensor ladders 102, 104 such that the first and second signal are configured to match one another.

Figure 2:
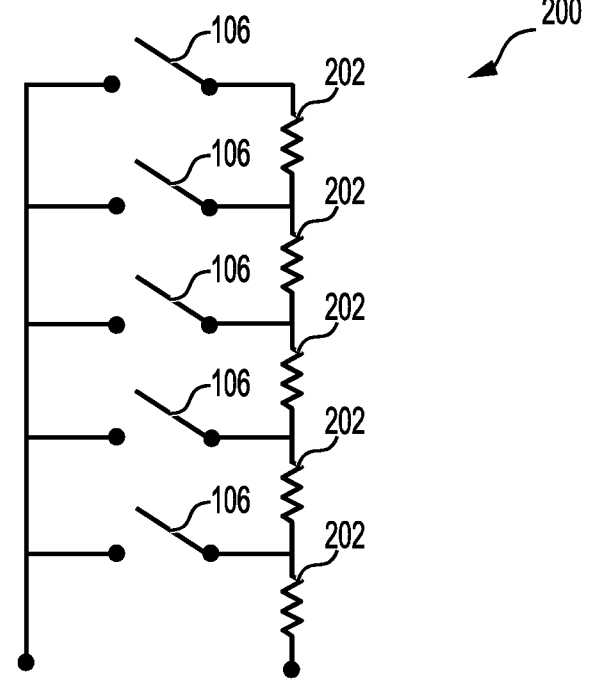
FIG. 2 depicts a diagram of an exemplary electrical circuit relating to some embodiments of the invention.

Turning now to FIG. 2, a diagram of an exemplary electrical circuit 200 is depicted relating to some embodiments of the invention. In some embodiments, the electrical circuit 200 represents a respective ladder such as either of the first sensor ladder 102 or the second sensor ladder 104. Accordingly, the electrical circuit 200 may comprise a plurality of reed switches 106, as shown. In some embodiments, the reed switches 106 may be normally opened but are configured to close when the magnet 110 is in proximity to each respective reed switch 106. In some embodiments, a plurality of resistors 202 are included within the electrical circuit 200, as shown. In some embodiments, a respective resistor 202 is paired with each reed switch 106. Accordingly, a different overall electrical resistance may be applied within the electrical circuit 200 based on a specific reed switch 106 being closed. Here, the number of resistors within the electrical path may vary based on which reed switch 106 is closed. For example, in some embodiments, every resistor 202 below a closed switch may be included in the electrical circuit. In some embodiments, the resistors 202 may be added in series as different switches become closed such that the overall resistance increases as the position of the float 108 changes. As such, the position of the float sensor may be determined based on a measured resistance or voltage from the circuit, as described below in connection with FIG. 3. Accordingly, the position of the magnet 110, the float 108, and corresponding oil level may be deduced from a measured signal voltage, which is relative to the electrical resistance from the resistors 202. It should be understood that, in some embodiments, the circuit may be arranged such that the resistance increases as the height of the float 108 increases. Alternatively, embodiments are contemplated in which the circuit may be arranged such that the resistance decreases as the height of the float 108 increases.

It should be understood that the electrical circuit 200 shown in FIG. 2 is just one example and that alternative electrical arrangements are also contemplated. For example, in some embodiments, the reed switches 106 may be normally closed and are configured to open when a magnetic field of the magnet 110 acts upon each respective reed switch 106. Further, a different number of resistors 202 or reed switches 106 may be included. Further still, embodiments are contemplated in which the electrical components of the electrical circuit 200 may be arranged differently than as shown herein.

It should further be understood that the oil level sensor assembly 100 of FIG. 1 and the electrical circuit 200 of FIG. 2 are shown merely to illustrate the operational environment of the invention. Accordingly, the oil level sensor assembly 100 and associated electrical circuit 200 are shown to describe the application of fault detection logic to identify faults within the sensor assembly 100, as will be described in further detail below.

Figure 3:
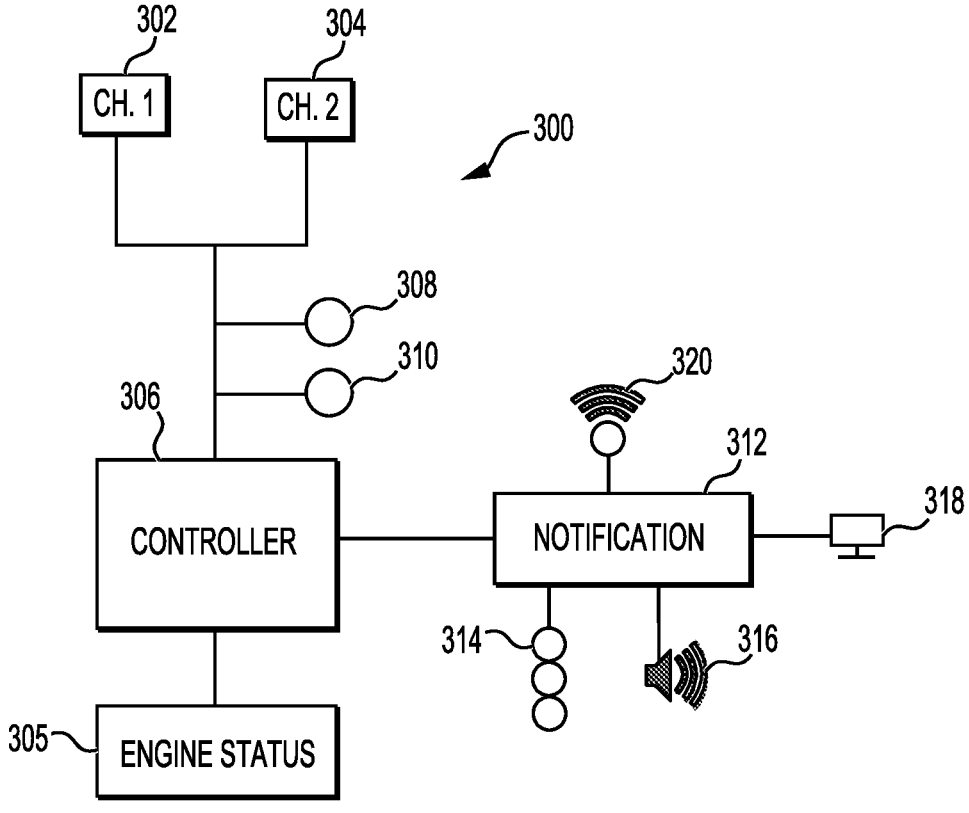
FIG. 3 depicts an exemplary system diagram of an aviation electronics assembly relating to some embodiments of the invention.

Turning now to FIG. 3, an exemplary system diagram of an aviation electronics assembly 300 is depicted relating to some embodiments of the invention. In some embodiments, the aviation electronics assembly 300 comprises a first communication channel 302 for receiving a first signal from the first sensor ladder 102, a second communication channel 304 for receiving a second signal from the second sensor ladder 104, and a controller 306. In some embodiments, the controller 306 may comprise any of a microcontroller, a microprocessor, or a processor for processing the one or more signals received from the first communication channel 302 and the second communication channel 304. In embodiments, the first signal and the second signal are measured signal voltages as described above. The measured signal voltages, which change according to the number of resistors 202 included in the circuit based on the position of the reed switches 106, are detected by the controller 306.

In embodiments, an engine status 305 is provided to the controller 306. The aircraft engine status is for example a signal provided from an aircraft engine via an engine controller, such as a full-authority digital engine control (FADEC) controller, or the engine status signal may be provided indirectly from the engine to the controller 306 via an aircraft avionics system, for example. The aircraft engine status signal is indicative of the current state of the aircraft engine. Examples of the engine status include "off", "starting", or "running". The aircraft engine status signal may be used by the controller 306 to determine whether the oil level in the engine is static (e.g., while in the off state) or if the engine oil level is dynamically changing (e.g., during startup or while running). When the oil level is static (e.g., when the engine status is off), a static sensor check may be performed to check that the first and second signals match, and if so, the controller 306 may proceed with determining the aircraft engine oil level based on the first and second signals. When the oil level is dynamic (e.g., when the engine is starting or running), the controller 306 may inhibit the static check and any subsequent oil level measurement to prevent incorrect oil level information from being displayed, as described below in connection with FIG. 4B. Instead, a dynamic sensor check may be performed to ensure that the float 108 is not stuck.

In some embodiments, the aviation electronics assembly 300 further comprises one or more additional sensors such as a temperature sensor 308 and a pressure sensor 310, as shown. In some such embodiments, the temperature sensor 308 and pressure sensor 310 may be disposed within the aircraft engine for measuring an engine oil temperature and pressure respectively. In some embodiments, each of the first communication channel 302, the second communication channel 304, the temperature sensor 308, and the pressure sensor 310 may be communicatively coupled to the controller 306 such that the controller 306 receives and processes signals from one or more of the connected components. For example, in some embodiments, the controller 306 may compare the signals received from each of the first communication channel 302 and the second communication channel 304. In some embodiments, the controller 306 further considers oil temperature and oil pressure readings received from the temperature sensor 308 and pressure sensor 310 respectively. Additionally, embodiments are contemplated in which additional sensors (e.g., the temperature sensor 308 and the pressure sensor 310) may not be included or are not considered as part of a sensor fault check.

In some embodiments, the aviation electronics assembly 300 further comprises a notification subsystem 312 communicatively coupled to the controller 306, as shown. In some embodiments, the controller 306 is configured to transmit a notification signal to the notification subsystem 312. Here, the notification signal may be indicative of the signals received and processed by the controller 306. For example, the controller 306 may provide a notification based on a determination that the signals from the first communication channel 302 and the second communication channel 304 are significantly different. In some embodiments, the notification subsystem 312 may be coupled to one or more output devices such as an LED indicator 314, an audio output device 316, or a display device 318. Accordingly, the notification subsystem 312 may provide notifications to one or more operators via the output devices. For example, the LED indicators 314 may be activated based in part on a signal received from the controller 306. Further, in some embodiments, an audible alarm may be produced by the audio output device 316. Further still, in some embodiments, information may be displayed on the display device 318. Additionally, embodiments are contemplated in which a combination of notification outputs may be used. For example, both the LED indicator 314 and the audio output device 316 may be activated based on a measured oil level. In some embodiments, the one or more operators include any of aircraft personnel or pilots, as well as remote aircraft personnel who may be remote from the aircraft. Accordingly, in some embodiments, the aviation electronics assembly 300 may further comprise a wireless transmitter or transceiver 320 for transmitting and receiving signals to and from a remote source.

Figure 4A:
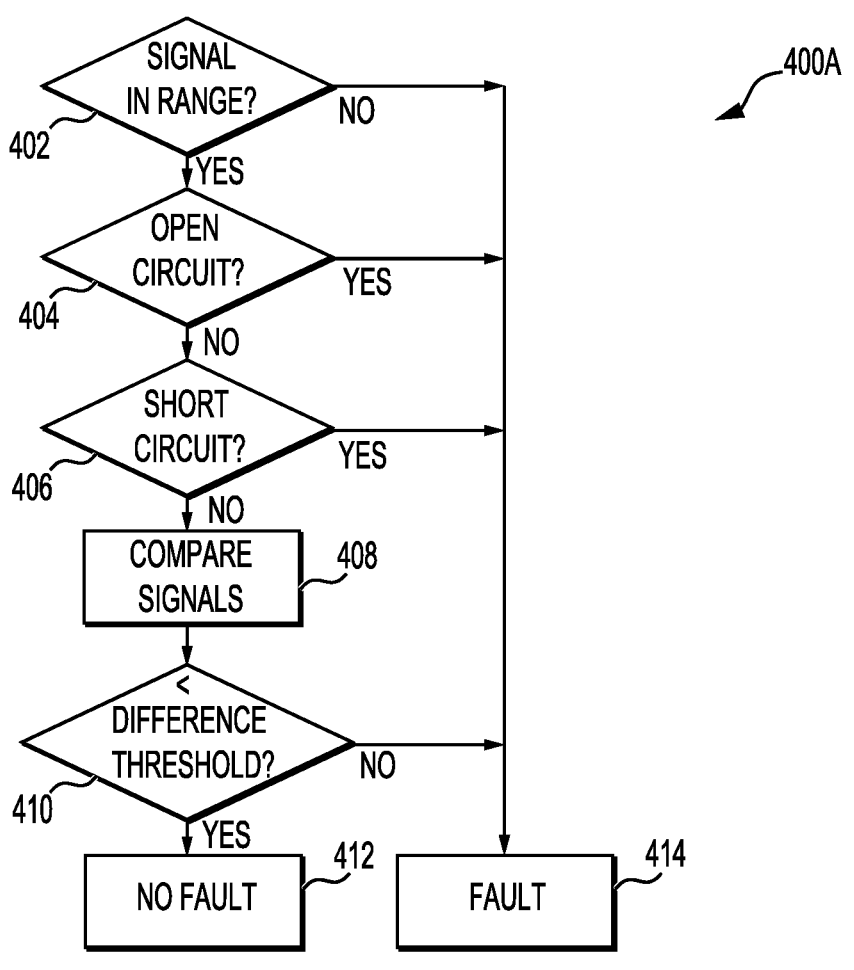
FIG. 4A depicts an exemplary flow diagram of a method for identifying a sensor fault relating to some embodiments of the invention.

Turning now to FIG. 4A, an exemplary flow diagram of a method 400A for identifying a sensor fault is depicted relating to some embodiments of the invention. In some embodiments, at least a portion of the steps of method 400A may be carried out by the controller 306, for example, using a processor associated with the controller 306. At step 402, it is determined whether a signal from either of the first channel 302 or the second channel 304 is within an expected range. The expected range is a predefined range based on a specific type of sensor used. For example, in some embodiments, the expected range is a measured resistance between 15 Ohms and 550 Ohms. However, it should be understood that these values are only one example and that additional embodiments are contemplated in which other predetermined ranges and thresholds may be used. Further, in some embodiments, the values may be monitored over time. For example, a fault may only be triggered if the signal values are out range for more than 5 seconds or some other predetermined time duration.

At step 404, it is determined whether the electrical sensor circuit is open. If the circuit is open, a fault will be returned, as shown. At step 406, it is determined whether the electrical sensor circuit is shorted out. If the circuit is shorted, a fault will be returned, otherwise the method will continue to step 408. In some embodiments, open circuits and short circuits may be detected by monitoring current flowing through the circuit. For example, if no current is flowing, the circuit may be identified as open. Conversely, if a substantially large amount of current is flowing a short circuit may be detected. Accordingly, various electronic issues within the sensor assembly 100 may be detected. For example, electrical connections may become worn over time such that shorts and open circuits may be produced. As such, these electrical issues are monitored such that operators can be notified of faulty electrical connections before sensor data is considered, for example, during a pre-flight check.

At step 408 the signals received from the first communication channel 302 and the second communication channel 304 are compared. At step 410, it is determined, based on the comparison of step 408, whether the difference of the two signals is below a predetermined difference threshold. In some embodiments, a difference threshold of 75 Ohms may be used. Accordingly, if the signals are within 75 Ohms of each other, the process will continue to step 412. Alternatively, if the signals are outside of 75 Ohms from each other a fault will be returned. It should be understood that other difference threshold values are also contemplated.

At step 412, no fault is returned because the signal is within the acceptable difference threshold. In some embodiments, if no fault is returned, normal operation of the aircraft engine may be continued without any notification to the operators. Alternatively, in some embodiments, a notification may be returned to the operators. In some embodiments, the notification may include a report or confirmation that the sensors are working properly. Accordingly, a manual check of the engine oil and associated sensors may be avoided. Alternatively, if the sensor check fails, a fault may be returned at step 414, as shown, indicating that at least one channel has failed. If a fault is returned, a manual check may be requested or maintenance may be requested to correct various sensor issues. In some embodiments, the reason for the fault may also be indicated to the operators. For example, in some embodiments, if the sensor check fails due to an open circuit from step 404, a fault notification may include an indication of the open circuit. Similarly, if a fault is returned because the signals are outside of the difference threshold, this information may be indicated within the fault notification.

It should be understood that in some embodiments, the method 400A may be repeated any number of times. For example, in some embodiments, the method 400A may be initiated in response to receiving a user input such as an operator selecting a preflight check button. Further, in some embodiments, the method may be initiated automatically as part of an automatic preflight routine. Further still, embodiments are contemplated in which the method 400A may be repeated once before each flight. Alternatively, or additionally, the method 400A may be performed periodically over time between flights.

Figure 4B:
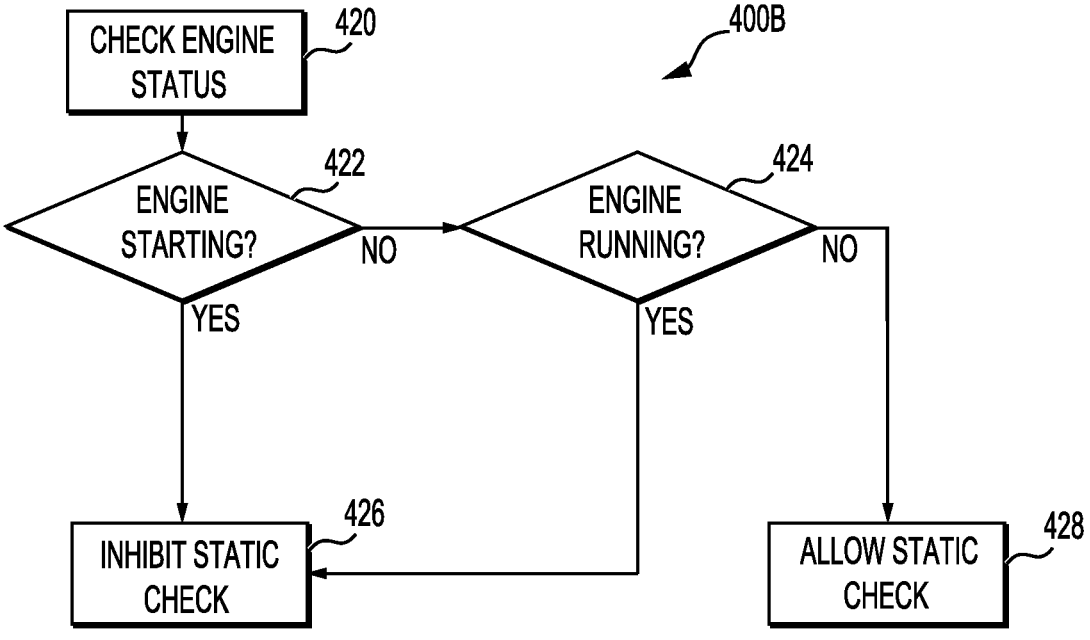
FIG. 4B depicts an exemplary flow diagram of a method for determining a sensor check availability relating to some embodiments of the invention.

Turning now to FIG. 4B, an exemplary flow diagram of a method 400B for determining a sensor check availability is depicted relating to some embodiments of the invention. At step 420 the operating status of the aircraft engine is checked. In some embodiments, the engine operating status may be checked from a list of potential engine statuses including off, starting, and running. For example, the controller 306 may receive an engine operating status indication from an engine controller (e.g., FADEC) or an aircraft avionics system. At step 422 it is determined whether the engine status is starting. In some embodiments, the starting engine status is associated with a start-up process for the aircraft engine. If the engine status is starting, a static sensor check may be inhibited at step 426. If the engine status is not starting, the process will move to step 424 where it is determined whether the engine status is running. If the engine status is running, the static sensor check will be inhibited at step 426. If the engine status is not running or starting, the static sensor check will be allowed, as shown at step 428. Accordingly, the static sensor check will only be allowed if the engine is not starting or running.

In some embodiments, it may be desirable to prevent static sensor checks while the engine is starting or running to prevent inaccurate data from being shared with operators. For example, in some embodiments, when the engine is starting the oil may flow out of the oil sump where the sensor assembly 100 is disposed. As such, static sensor checks which consider a variety of information should not be performed while the engine is starting or running. Instead, a dynamic check may be used to monitor faults of the sensor assembly during starting or running of the engine.

In some embodiments, a dynamic sensor check is performed during an engine starting event of the aircraft engine. Here, the oil level in the oil sump is expected to change position. Accordingly, by sensing this change in position during the engine starting event, it may be determined whether the float 108 is stuck within the engine. If no change in position is sensed a fault may be returned from the dynamic sensor check (e.g., the controller 306 may transmit a fault signal to the notification subsystem 312). If the change in position is confirmed, a successful dynamic sensor check may be indicated (e.g., via display device 318).

Figure 4C:
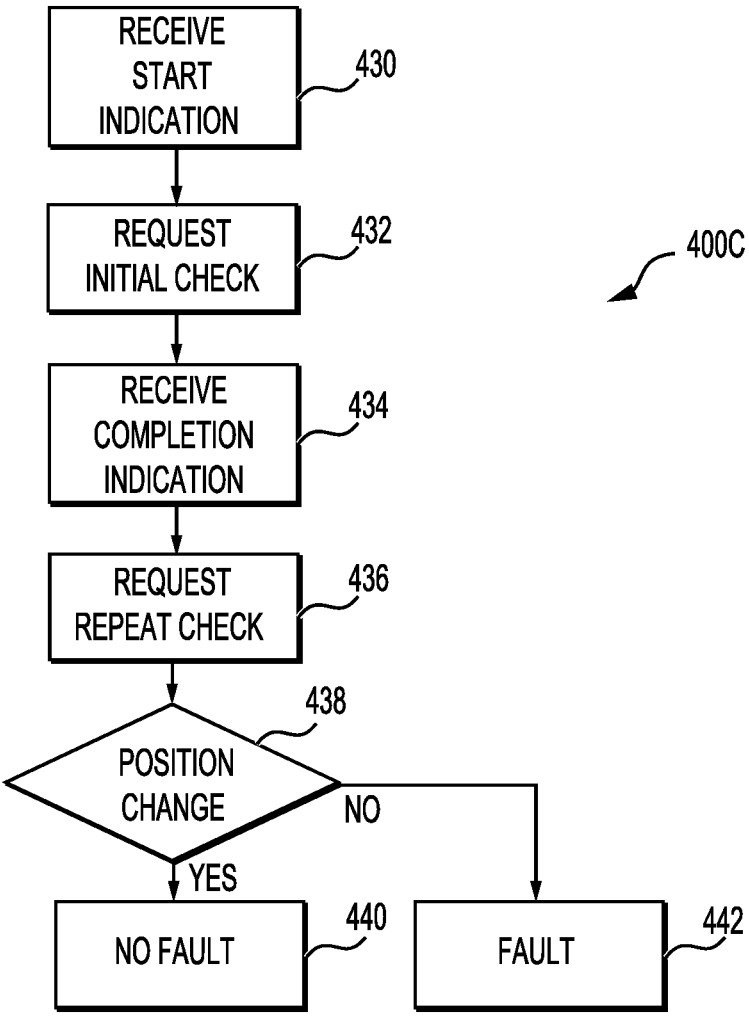
FIG. 4C depicts an exemplary flow diagram of a method for performing a dynamic sensor check relating to some embodiments of the invention.

Turning now to FIG. 4C, an exemplary flow diagram of a method 400C for performing a dynamic sensor check is depicted relating to some embodiments of the invention. At step 430, a start engine indication is received. In some embodiments, the start engine indication may be received by the controller 306 in response to the engine status changing from the off status to the starting status. At step 432, an initial (e.g., first) dynamic sensor check may be requested responsive to the received start indication. In some embodiments, an initial dynamic sensor check signal indicates an initial oil level of the engine oil immediately prior to the startup process being initiated.

At step 434, a start completion indication is received. In some embodiments, the start completion indication may be received by the controller 306 in response to determining that a startup cycle of the aircraft engine has been completed. In some embodiments, the start completion indication may be associated with the engine status changing from a starting state to a running state.

At step 436, a repeat (e.g., second) dynamic sensor check is requested in response to the received start completion indication. For example, the initial dynamic sensor check is repeated once the engine startup process has been completed. In some embodiments, a repeat dynamic sensor check signal verifies that the float switch is changing as the oil level changes.

At step 438, an initial oil level signal from the initial dynamic sensor check is compared with a repeat oil level signal from the repeat dynamic sensor check to determine if the position of the float has changed during startup of the aircraft engine. If a change in position is determined (i.e., a difference between the initial signal and the repeat signal), then no fault is returned at step 440. In some embodiments, if no fault is returned the normal operation of the engine may be continued without any notification. Alternatively, in some embodiments, a notification confirming that the dynamic check succeeded may be sent to the operators via notification subsystem 312. Conversely, if a change in position is not sensed, for example, where the initial signal and the repeat signal are similar or are within a certain range from one another, a fault will be returned at step 442. Accordingly, the dynamic sensor check is operable to identify a stuck float 108 by monitoring for an expected change in position. In some embodiments, the fault returned from the dynamic sensor check may include a stuck float indication via notification subsystem 312 for notifying the operators that the float 108 may be stuck within the engine.

It should be understood that in some embodiments, any of the methods 400A, 400B, and 400C may be repeated and performed any number of times as part of an oil level sensing and fault detection method. For example, in some embodiments, the dynamic sensor check may be repeated each time the aircraft engine is started. Accordingly, if the float 108 becomes unstuck after an initial sensor check the operators may be notified that the fault has been resolved. In some embodiments, the method 400B for determining sensor check availability may be performed periodically such that the engine status is updated and monitored over time. For example, the method 400B may be repeated after each of step 426 and step 428. Alternatively, in some embodiments, some of the methods may be performed once per preflight check or once per engine startup cycle.

Figure 5:
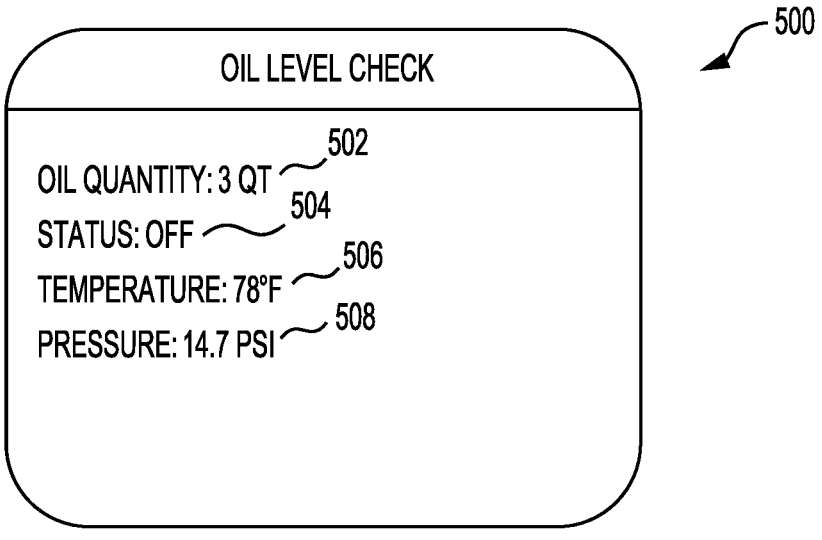
FIG. 5 depicts an oil level report relating to some embodiments of the invention.

Turning now to FIG. 5, an oil level report 500 is depicted relating to some embodiments of the invention. In some embodiments, the oil level report 500 may be displayed on a user device such as the display device 318 of FIG. 3 for viewing the oil level report 500. In some embodiments, the oil level report 500 is displayed for viewing by one or more operators of the aircraft. The oil level report 500 comprises a variety of different information such as, for example, an oil quantity indication 502 showing the measured quantity of oil in the engine, a status indication 504 showing the status of the aircraft engine, a temperature indication 506 showing the temperature of the aircraft engine such as measured by the temperature sensor 308, and a pressure indication 508 showing the pressure of the aircraft engine such as measured by the pressure sensor 310. In some embodiments, the oil level report 500 is only generated for display after a static check when the information is deemed to be accurate. For example, the oil level report 500 may be suppressed while the engine is starting or running because measured parameters such as the oil level will not be accurate during such engine states. Accordingly, only dynamic sensor checks may be performed for either of the starting or running engine statuses. Said dynamic sensor checks may be associated with a simplified notification indicating either of a fault or a success.

It should be understood that additional information is also contemplated to be included within the oil level report 500. For example, in some embodiments, other engine parameters may be included within the oil level report 500. Further, in some embodiments, the oil level report 500 may include a fault notification along with an identified reason for the fault. Further still, embodiments are contemplated in which various actions may be performed automatically in response to returning a fault. For example, in some embodiments, starting of the aircraft engine may be temporarily disabled when a sensor fault is returned to prevent the aircraft from being used when a sensor is faulty.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An oil level measurement system for measuring an oil level within an aircraft engine, the system comprising:
   a magnetic float disposed in the aircraft engine;
   a first sensor ladder configured for sensing a position of the magnetic float;
   a second sensor ladder configured for sensing a position of the magnetic float;
   an aircraft engine status signal indicative of a current state of the aircraft engine;
   a controller configured to receive the aircraft engine status signal, a first signal from the first sensor ladder, and a second signal from the second sensor ladder, wherein the controller is configured to determine an oil level of the aircraft engine based on the aircraft engine status signal, the first signal, and the second signal, such that when the aircraft engine is off a static oil level check is performed and when the aircraft engine is starting or running a dynamic oil level check is performed; and
   a notification subsystem communicatively coupled to the controller, wherein the notification subsystem is configured to notify a user of a fault when the first signal is determined by the controller to be different from the second signal, and the notification subsystem comprises a display device configured to display an oil quantity only when the oil level is static.

2. The oil level measurement system of claim 1 comprising a float guide, wherein the float guide comprises a vertical orientation configured to guide movement of the float along a vertical direction.

3. The oil level measurement system of claim 2, wherein the float guide comprises a track configured to receive the magnetic float such the magnetic float is constrained to move vertically along the track.

4. The oil level measurement system of claim 2, wherein the float guide comprises a rod and the magnetic float comprises a channel configured to receive the rod such that the magnetic float is constrained to move vertically along the rod via the channel.

5. The oil level measurement system of claim 1, wherein the first sensor ladder and the second sensor ladder have a similar architecture and construction to provide redundancy for increased reliability.

6. The oil level measurement system of claim 1, wherein the first sensor ladder comprises an electrical circuit having a plurality of reed switches arranged electrically in series and the second sensor ladder comprises an electrical circuit having a plurality of reed switches arranged electrically in series.

7. The oil level measurement system of claim 6, wherein each reed switch from the first sensor ladder and the second sensor ladder is configured to open or close based on a proximity with the magnetic float.

8. The oil level measurement system of claim 7, wherein the first sensor ladder and the second sensor ladder each comprise a plurality of resistors paired with a respective reed switch such that a resistance of the electrical circuit changes as a vertical position of the magnetic float changes.

9. The oil level measurement system of claim 8, wherein each reed switch from the first sensor ladder and the second sensor ladder is positioned vertically to correspond with a known oil level within the aircraft engine such that the first signal and the second signal each correspond with the known oil level.

10. The oil level measurement system of claim 1, wherein the controller is further configured to check that the first and second signals match when the aircraft engine is off, and when the first and second signals match the controller is configured to subsequently determine the oil level based on the first and second signals.

11. The oil level measurement system of claim 10, wherein the controller is further configured to inhibit determining the oil level based on the first signal and the second signal when the aircraft engine is starting or running.

12. The oil level measurement system of claim 1, wherein the controller is further configured to perform a dynamic sensor check by determining whether a position of the magnetic float is actively changing based on the first signal and the second signal when the aircraft engine is starting or running.

13. The oil level measurement system of claim 12, wherein the controller is further configured to provide a notification signal to the notification subsystem indicative of a successful dynamic sensor check when the position of the magnetic float is actively changing and the aircraft engine is starting or running.

14. The oil level measurement system of claim 12, wherein the controller is further configured to provide a notification signal to the notification subsystem indicative of a fault that the magnetic float may be stuck when the position of the magnetic float is not actively changing and the aircraft engine is starting or running.

* * * * *